United States Patent

Kaminsky et al.

[11] Patent Number: 6,157,960
[45] Date of Patent: Dec. 5, 2000

[54] TECHNIQUE FOR PROGRAMMATICALLY CREATING DISTRIBUTED OBJECT PROGRAMS

[75] Inventors: David Louis Kaminsky, Chapel Hill; Richard Adam King, Cary; Zhiyong Li, Durham, all of N.C.

[73] Assignee: International Business Machines Corporation, Armonk, N.Y.

[21] Appl. No.: 08/852,263

[22] Filed: May 7, 1997

[51] Int. Cl.[7] .................................................. G06F 9/46
[52] U.S. Cl. .......................... 709/303; 709/300; 709/228
[58] Field of Search .................................. 709/304, 300, 709/303, 245, 228

[56] References Cited

U.S. PATENT DOCUMENTS

| | | | |
|---|---|---|---|
| 5,136,716 | 8/1992 | Harvey et al. | 709/228 |
| 5,481,721 | 1/1996 | Serlet et al. | 709/303 |
| 5,640,564 | 6/1997 | Hamilton et al. | 709/304 |
| 5,684,955 | 11/1997 | Meyer et al. | |
| 5,768,532 | 6/1998 | Megerian | 709/245 |
| 5,822,521 | 10/1998 | Gartner et al. | 709/304 |
| 5,822,585 | 10/1998 | Noble et al. | 709/304 |
| 5,948,072 | 9/1999 | Cink et al. | 709/304 |

FOREIGN PATENT DOCUMENTS 2305270  2/1997  United Kingdom ............. G06F 9/46

OTHER PUBLICATIONS

IBM Corporation; SOMobjects Developer's Toolkit; Programmer's Guide, vol. I: SOM and DSOM; pp. 229–285, 1996.

*Primary Examiner*—Zarni Maung
*Assistant Examiner*—Bradley Edelman
*Attorney, Agent, or Firm*—Jeanine S. Ray-Yarletts; Marcia L. Doubet

[57] ABSTRACT

The automatic object distribution of the present invention allows object oriented programs to be run as distributed programs without any explicit networking code, and without using an interface definition language (IDL). The present invention allows programmers to experiment with different distributions without complicating the programming task. It accomplishes this by generating two proxies that allow method calls written for local invocation to be invoked over a network. These dynamically-generated proxies allow calls to flow across a network as if they were local.

15 Claims, 5 Drawing Sheets

TECHNIQUE FOR PROGRAMMATICALLY CREATING DISTRIBUTED OBJECT PROGRAMS

FIELD OF THE INVENTION

The present invention relates generally to computer programming methods and systems, and, in particular, to object oriented programming and to methods and systems of running object oriented programs on multiple computers connected by a network.

BACKGROUND OF THE INVENTION

Figure 1:
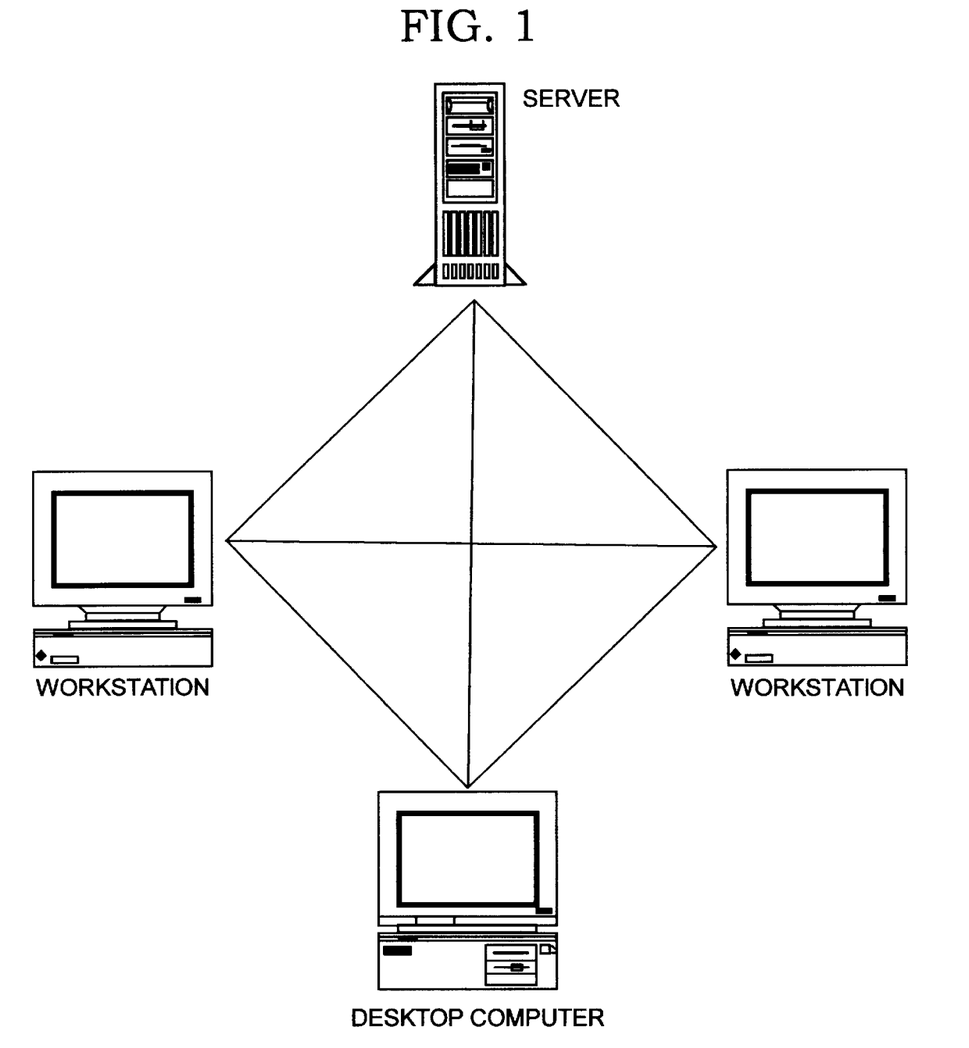
FIG. 1 depicts a sample network upon which the present invention may appear.

The distribution of a single program, so that a portion of the program executes on more than one computer has become more pervasive as "desktop" computers become more powerful. FIG. 1 demonstrates an example of a computer network containing several distributed computers upon which an application can execute. While most computer networks are many orders of magnitude larger, this small network is used as an example. Presently, many computer systems allow objects to communicate over a network. One method of allowing objects to communicate over a network is RPC, which stands for Remote Procedure Calls. RPC has existed since the mid 1980s and is further described by Birrell and Nelson in *Implementing Remote Procedure Calls,* ACM Transactions on Computer Systems 2, 1984, pp 39–59. Further improvements have been made to RPC, such as DSOM, or Distributed Systems Object Model, continuing into the present. In the systems of the prior art, the programmer describes the interfaces to the objects using an Interface Definition Language (IDL). The systems then provide tools that automatically transform the IDL specification into executable code.

Recently, Sun Microsystems released an object oriented programming language called Java which includes a capability similar to that of RPC and DSOM called Remote Method Invocation, or RMI. Using systems which are Java enabled, the programmer can now write a distributed object program without explicit recognition of the network upon which the program will be running. However, using this technology, the programmer or implementer is still required to write additional code that enables remote invocation of objects (or write the IDL specification). As with all coding tasks, writing IDL is error-prone. In addition, should the programmer determine that the point at which he chose to distribute the objects is sub-optimal, he must delete the current specification, and write another. Since choosing the optimal distribution point is a difficult task, this problem occurs often in modem programming environments. In addition, the optimal distribution point may vary based on computing topologies. For example, if two computers are equally powerful, then the optimal distribution might have an equal number of objects executing on each computer; if the two computers have disparate capabilities, then the more powerful computer might execute more of the objects. Since heterogeneous computing topologies are common, code written statically using an IDL often results in suboptimal performance.

Alternatively, many program-creation tools allow a programmer to specify a program using the tool, and indicate the object boundaries at which the objects are to be distributed. The tool then generates the executable code for the program. However, these tools generate static program partitions, and thus suffer from heterogeneity problems similar to IDL systems. In addition, tools do not typically interoperate. Thus, multiple programmers working on the same program are forced to standardize on the same tool to work effectively together. Since tools have strengths and weaknesses, standardizing on a single tool is undesirable.

OBJECT OF THE INVENTION

It is an object of the present invention to provide an improved method for creating distributed-object programs that allows the programmer to write a program as if it were running locally.

It is a further object of the present invention to create the distribution of the objects without modifying the classes created by the programmer.

It is yet a further object of the present invention to create the distribution of the objects without the need for a program creation tool.

SUMMARY OF THE INVENTION

Figure 2:
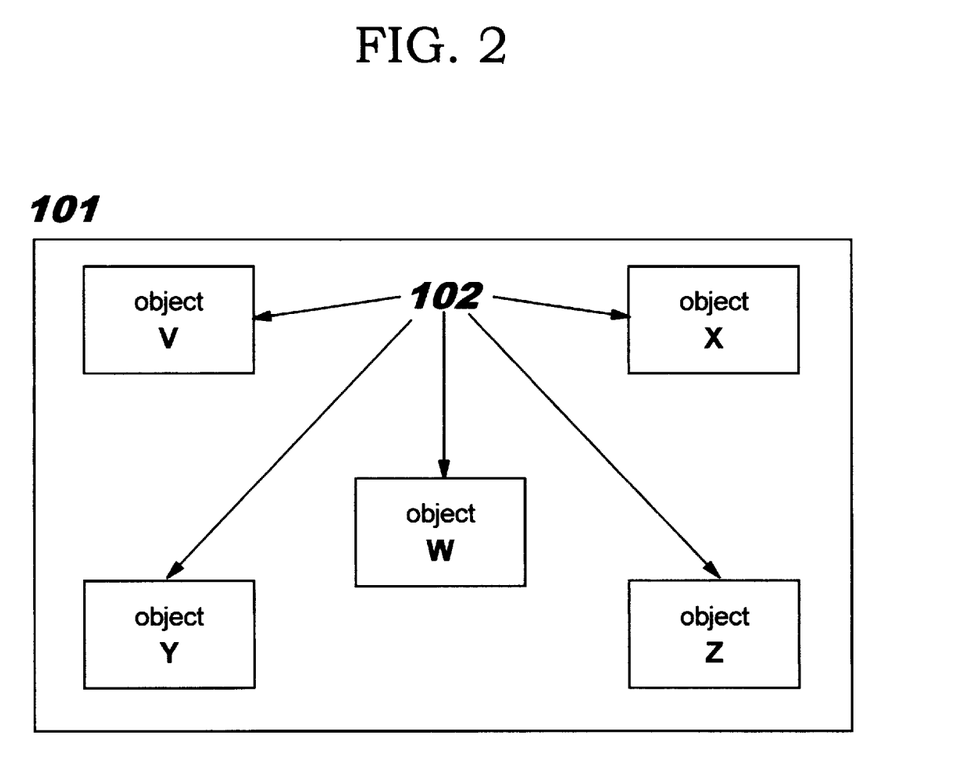
FIG. 2 depicts a computer memory containing five objects.
Figure 3:
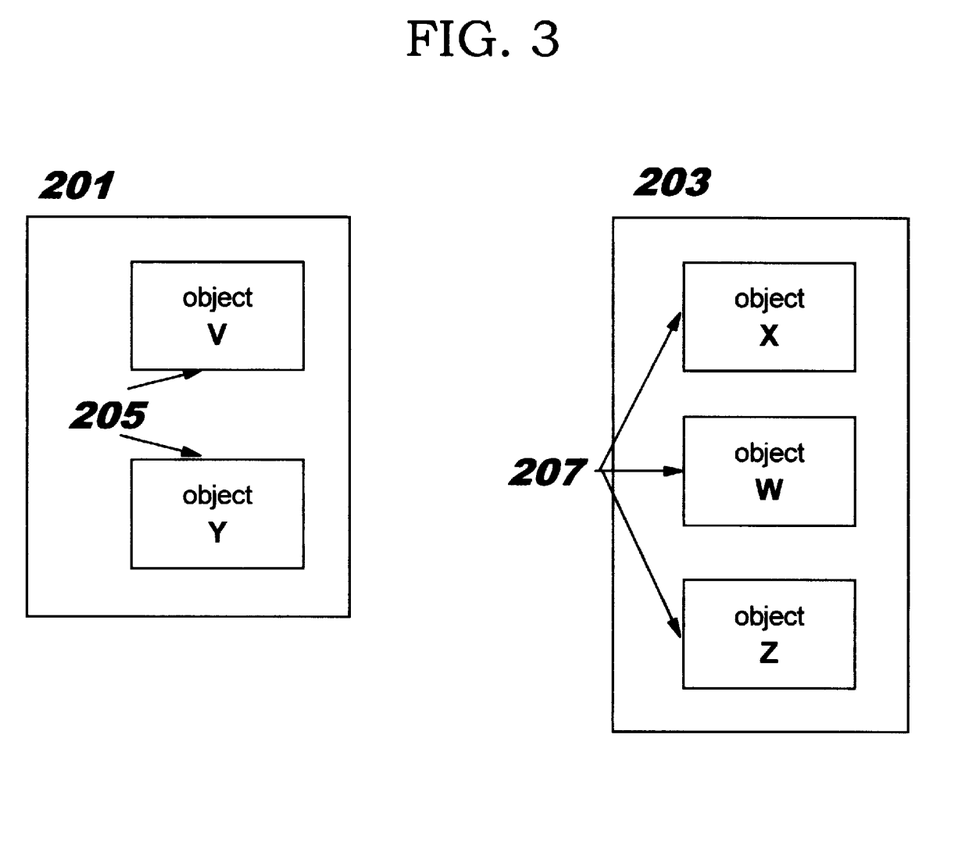
FIG. 3 depicts a distributed system upon which two objects execute in one computer memory and three objects execute in a different computer memory.

The present invention describes a system, method and program product for executing or running objects remotely which is herein referred to as Automatic Object Distribution (AOD). As shown in FIG. 2, an object oriented program is written with many independent objects that call each other to perform a unified function. FIG. 2 depicts a computer memory 101 in which objects 102 V, W, X, Y & Z all reside. The present invention allows a user to move some of the objects from a first computer to a second computer to be executed. This is shown in FIG. 3. In FIG. 3 objects V & Y 205 remain in a first computer memory 201 while objects W, X, & Z 207 are moved to a second computer memory 203. This can be done, for instance, to balance the workload between the first computer and the second computer. This creates additional complexities since each of the program objects are capable of calling external routines herein referred to as methods. The separation of the program objects into multiple computers for execution requires that all of the methods or objects, which due to the separation of the objects to different computer memories now access methods which are no longer coresident with the calling method on the same system, know that some of the objects are located elsewhere on the network and understand how to access those remote objects.

The Automatic Object Distribution (AOD) of the present invention eliminates the requirement that programmers write their programs with the knowledge that the objects will be distributed over a network. It also eliminates the need for programmers to write programs in a special language that supports distributed objects, or to write using any particular tool when wanting to distribute the work across the network. Instead, using the present invention, programmers write programs in a common object-oriented language, such as Java (Java is a trademark of Sun Microsystems), and compile the code into unlinked executable code. (In the computing literature, unlinked executable code is often called "object code". When describing object-oriented systems, the use of the term "object code" creates confusion, therefore the term "bytecodes" has been adopted for purposes of the present invention.) The programmer writes the code exactly as if writing a program that will execute on a single machine; he does not decorate the program with any additional information as he would with IDL systems. The programmer then decides where the distribution should occur, and the AOD generates the distribution code.

The AOD performs the distribution by generating two proxies. The proxies allow method calls written for local invocation to be invoked over a network. If a split is indicated between some class Y to be executed locally, and some class X to be executed remotely, the AOD process generates the proxies to overcome the intervening network. Together, these proxies intercept the calls from Y, pass them to X, and return the result to Y. This is shown in more detail in FIGS. 4A and 4B.

Figure 4A:
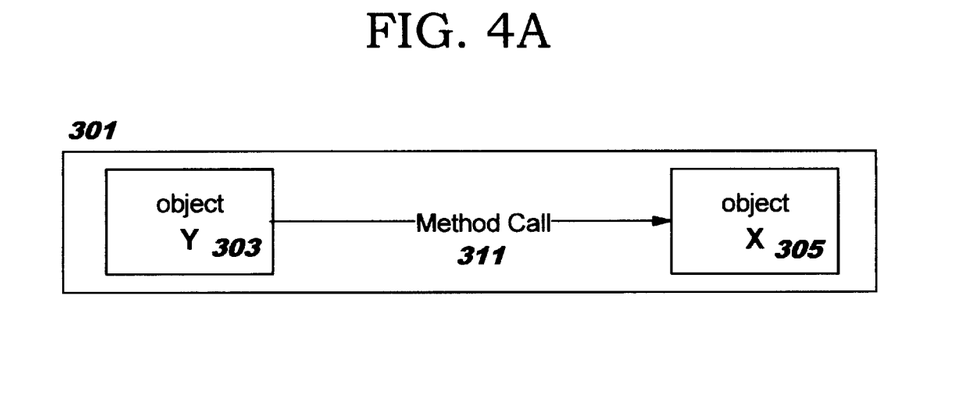
FIG. 4A depicts a method where two objects execute in the same memory.

FIG. 4A represents the computer system in which a program is running in a single memory 301. Both object Y 303 and object X 305 reside in the same memory and a method call 311 is used to invoke object X 305 from object Y 303.

Figure 4B:
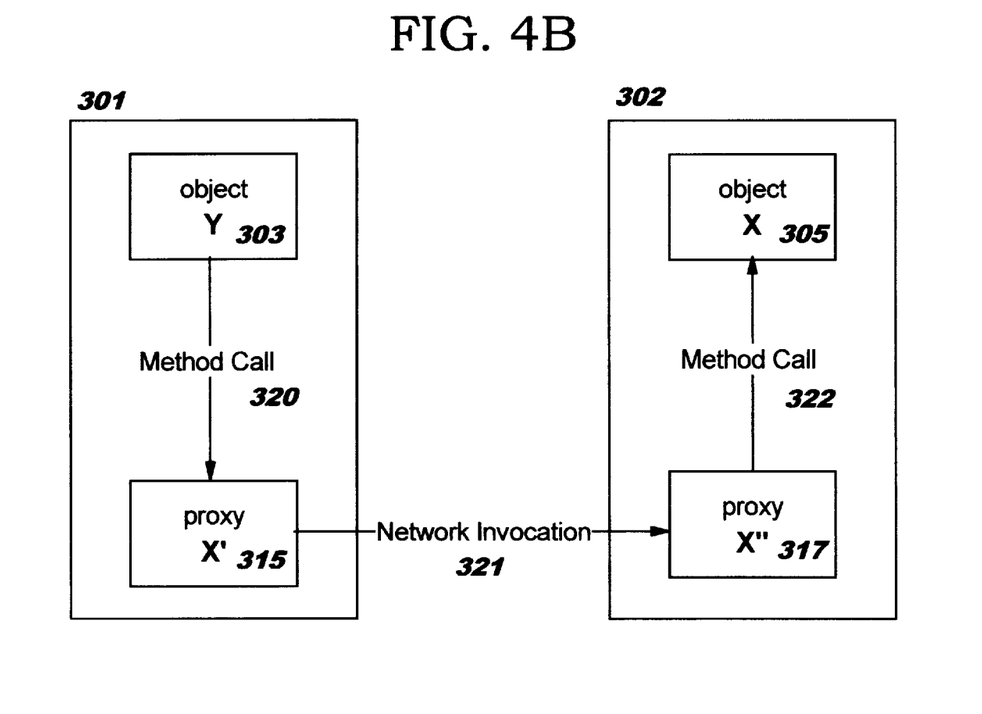
FIG. 4B depicts the objects of FIG. 4A after being distributed using the present invention.

As shown in FIG. 4B, the AOD process uses information in the bytecode file for a class, say X 305, to generate the two proxy files (X' 315 and X"317) that contain classes serving as proxies for X 305. X' 315 contains a class named X that has all of the public methods in X 305. (Note that since the original class X 305 file will be located on the remote machine, no name conflict exists.) X" 317 contains a class with a unique name (X") that contains the method that makes calls to the public methods in class X. X' 315 resides on the same machine as Y 303; X" 317 resides on the same machine as X 305. Since X' 315 contains a class called X and that class contains all of the public methods in X 305, when Y 303 makes a call against a method in the original class X 305, that call is actually made against a method in the new class X residing locally and contained in file X' 315. X' 315 passes the call information to X" 317 which then makes a local call to X 305. The results of the local call are propagated back to Y 303 by way of X" 317 and X' 315. The result is that the application, written to execute locally, can be distributed across the network without requiring that the programmer write or change any of the program code.

DETAILED DESCRIPTION OF THE PREFERRED EMBODIMENT

The preferred embodiment of the present invention will be herein described in more detail with reference to the drawings. The present invention is not limited to the preferred embodiment. The present invention is applicable to any automated distributed programming utilizing proxies. Automatic object distribution (AOD) of the preferred embodiment uses the Java programming environment although the present invention is not limited to Java and the application of this invention to other object-oriented environments would be straightforward to one skilled in the art. The preferred embodiment of the present invention assumes that the programmer has written a program in Java as if it were to run locally (e.g., it does not include any Remote Method Invocation code), and used the standard Java compiler to compile the source files into corresponding bytecode files. The AOD process then utilizes the convention that, in object oriented programming, all objects are to be accessed through method calls (not through direct access to public variables). In Java, each class compiles into a separate bytecode file. (Hence, bytecode files are often called "class files.") The programmer then identifies which classes are to be moved to a remote machine and which will remain local. The process of identifying such classes can be accomplished by typing the names of the files containing the classes into a tool implementing the present invention.

Figure 5:
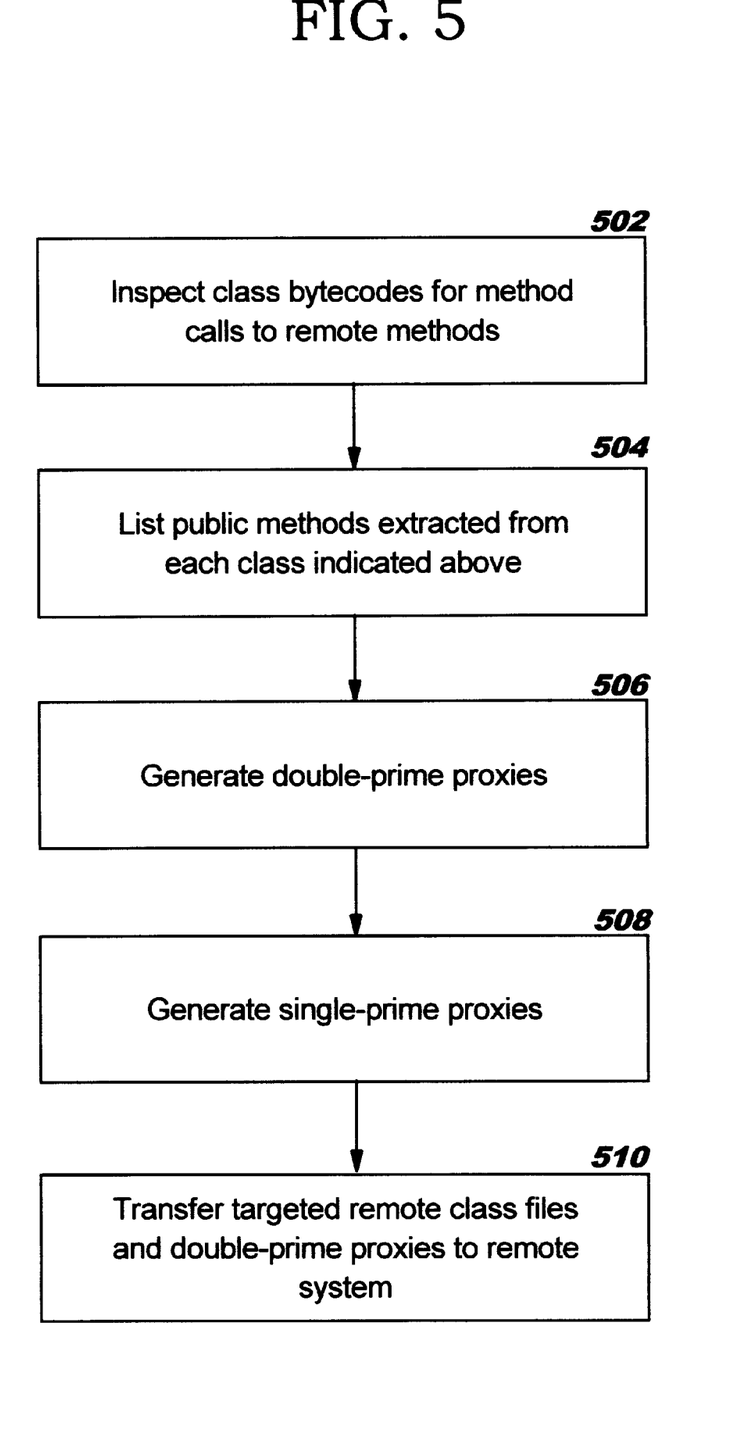
FIG. 5 is a flow chart of the distribution method of the present invention.

To run the objects remotely using the preferred embodiment of the present invention, the AOD, using the input as to which classes will be kept local and which classes will be moved remote, does the following as referred to in FIG. 5:

1) AOD inspects the bytecode for each class to determine which classes will receive method calls in classes that will execute remotely 502.

2) For each object X that will be called upon at a remote machine, a list of its public methods is extracted from bytecode file for X, and stored 504.

3) Based on the list of public methods, a proxy, called X" is generated. X" is constructed to contain methods which have similar names as the public methods in X. Each of the constructed methods make corresponding method calls against X. It also contains the code necessary to register itself with the RMI registry 506.

4) Based on the list of public methods, a proxy, called X' is generated. X' is constructed to contain the public methods in X. Each of the constructed methods make corresponding remote method calls (using Java's RMI function) against X". This proxy class has the same name that X does 508.

5) All of the original bytecode files designated as remote and all "double-prime proxies" are transferred to the remote machine; all bytecode files designated as local and all "prime" proxies remain on the local machine 510.

Each step is described in more detail below:

1) The Java compiler (and compilers of many object-oriented languages) generates a bytecode file in a well-known format which allows the inspection process to occur successfully. To allow the various bytecode files to be linked together, each bytecode file contains information about the methods called from each class. Thus, by reading the information about the methods from the file, AOD can generate the required list of interrelated classes.

2) Similarly, the bytecode files contain information about the public methods of the class described by the bytecode file. Thus, by reading the information about the public methods from the file, AOD can generate a list of all public methods. The bytecode files also contain information about parameters and return values.

Note that some implementations of Java contain a function called "reflection" that allows programmatic determination of public methods supported by a class. If reflection is implemented, it can be used to replace the process of inspecting the bytecode file.

3) Given the list of all public methods on a class, it is straightforward to generate a double-prime proxy class (X") that contains the similarly named methods, and each of these methods makes calls to the method on X. In the preferred embodiment, the calls are generated as Java source, and compiled dynamically using Java's standard dynamic compilation facility. Thus, if X contains methods A and B, X" would be written as:

```
Class Xprimeprime extends UnicastRemoteObject
                implements XprimeprimeInterface {
    X x;
    Xprimeprime () {// initializer
        x = new X ();
    }
    A_AOD () {// passes through calls to A
        x.A();
    }
    B_AOD () {// passes through calls to B
        x.B();
    }
```

Note that we have used the convention that the method in the proxy is suffixed with "_AOD." For example, the method "A_AOD" calls the method "A" in X. Any convention can be used so long as it is reproducible and consistent.

4) Given the list of all public methods on a class, it is similarly straightforward to generate a prime proxy class (X') that contains those methods, and that makes remote calls (using RMI) to similarly named methods on X". In the preferred embodiment, the calls are generated as Java RMI source, and compiled dynamically using Java's standard dynamic compilation facility.

In addition to the proxy X", an interface X" Interface which contains the signatures for all of the public methods in X is also generated as required by Java's standard RMI implementation.

Given the same information on all public methods on a class, it is also straightforward to generate the interface X' Interface.

```
Interface XprimeprimeInterface extends java.rmi.Remote {
    A_AOD();
    B_AOD();
}
```

Thus, if X contains A and B, X' would be generated as:

```
Class Xprime {
    XprimeprimeInterface x;
    Xprime () {// constructor
        x = (XprimeprimeInterface)Naming.lookup(Xprimeprime);
        // do the RMI lookup
    }
    A() { // call remote A
        x.A_AOD();
    }
    B() { // call remote B
        x.B_AOD();
    }
}
```

In this example, Naming.lookup( ) will return a remote reference to X" by querying the RMI registry. By convention, the return object is cast to the type of X"Interface.

Note that while the proxy class is called X, no name collision occurs with the original X. Since the proxy X will execute on the local machine, and the original X was identified as moving to the remote machine, only one X exists per machine.

5) The files are then transferred by any means available on the system where this function is implemented.

Once the proxies have been established as shown in FIG. 4B, the following occurs at execution time:

Assume that the programmer chooses to distribute the program between some object Y and some object X, where Y accesses X only through method calls. When Y calls a public method foo( ) on X, the following occurs. First Y makes the call to foo( ) as usual. (It must since its code is unchanged). Since the proxy Xprime is the only X on the local machine and it contains a method foo( ), the call will be made on the prime proxy for X.

By construction, the method foo( ) in X makes an RMI call to method foo_AOD( ) on the remote double-prime proxy, returning the results. By construction, foo( )_AOD on the double-prime proxy makes a local call to foo( ) on X. Since X is unchanged, it will execute the original foo( ), passing back the results to foo_AOD in the double-prime proxy, which passes them to the prime proxy, which returns them to Y. Thus, the call is semantically equivalent to a local call.

Because this process does not impact the original files, and does not require any programmer intervention to realize the distribution, it becomes quite easy for a programmer to test different class distribution points. This enables programs to execute more efficiently without significant impact to the programmers.

In addition, since the distribution requires no additional programming, a system administrator can deploy multiple instances of the same program on different computing configurations, each with its own distribution (and thus performance characteristics), depending on the particular characteristics of the segment of the computing environment. This distribution requires no additional programming and does not require any change to the original program.

What is claimed is:

1. A method for programmatically creating distributed object programs, said method comprising the steps of:

identifying a plurality of objects in a program to be distributed, wherein each of said objects contains one or more programmed methods;

determining a first set of objects which are to reside on a first computer and a second set of objects which are to reside on a second computer, wherein said first set and said second set together comprise said identified plurality;

determining a first plurality of programmed methods which are accessed from said objects in said first set but which are contained in said objects of said second set;

determining a first subset of said objects in said second set which contain said first plurality of programmed methods;

programmatically generating a first local proxy and a corresponding first remote proxy for each object in said first subset, said first remote proxy containing at least one programmatically generated remote method, wherein each of said programmatically generated remote methods accesses a corresponding method from said first plurality of programmed methods and said first local proxy containing network linkage and at least one programmatically generated local method, wherein each of said programmatically generated local methods accesses a corresponding one of said programmatically generated remote methods in said first remote proxy using said network linkage;

installing said first set of objects and said first local proxy for each object of said first subset on said first computer;

installing said second set of objects and said first remote proxy for each object of said first subset on said second computer; and transparently accessing selected ones of said first plurality of programmed methods in selected ones of said objects in said second set, in response to invocation by selected ones of said objects in said first set, through a selected one of said first local proxies and a corresponding one of said first remote proxies.

2. The method as claimed in claim 1, wherein said programmatically generated local methods in said first local proxy for each object have identical names as corresponding methods in said first plurality of programmed methods.

3. The method as claimed in claim 1, wherein said network linkage includes statements for remote invocation of each of said corresponding ones of said programmatically generated remote methods in said first remote proxy.

4. The method as claimed in claim 1, further comprising the steps of:

determining a second plurality of programmed methods which are accessed from said objects in said second set but which are contained in said objects of said first set;

determining a second subset of said objects in said first set which contain said second plurality of programmed methods;

programmatically generating a second local proxy and a corresponding second remote proxy for each object in said second subset, said second remote proxy containing at least one programmatically generated remote method, wherein each of said programmatically generated remote methods accesses a corresponding method from said second plurality of programmed methods and said second local proxy containing network linkage and at least one programmatically generated local method, wherein each of said programmatically generated local methods accesses a corresponding one of said programmatically generated remote methods in said second remote proxy using said network linkage;

installing said second local proxy for each object of said second subset on said second computer;

installing second remote proxy for each object in said second subset on said first computer; and transparently accessing selected ones of said second plurality of programmed methods in selected ones of said objects in said first set, in response to invocation by selected ones of said objects in said second set, through a selected one of said second local proxies and a corresponding one of said second remote proxies.

5. The method as claimed in claim 4, wherein said programmatically generated local methods in said second local proxy for each object have identical names as corresponding methods in said second plurality of programmed methods.

6. A computer program product for programmatically creating distributed object programs, said computer program product embodied on computer-readable storage media and comprising:

computer-readable program code means for identifying a plurality of objects in a program to be distributed, wherein each of said objects contains one or more programmed methods;

computer-readable program code means for determining a first set of objects which are to reside on a first computer and a second set of objects which are to reside on a second computer, wherein said first set and said second set together comprise said identified plurality;

computer-readable program code means for determining a first plurality of programmed methods which are accessed from said objects in said first set but which are contained in said objects of said second set;

computer-readable program code means for determining a first subset of said objects in said second set which contain said first plurality of programmed methods;

computer-readable program code means for programmatically generating a first local proxy and a corresponding first remote proxy for each object in said first subset, said first remote proxy containing at least one programmatically generated remote method, wherein each of said programmatically generated remote methods accesses a corresponding method from said first plurality of programmed methods and said first local proxy containing network linkage and at least one programmatically generated local method, wherein each of said programmatically generated local methods accesses a corresponding one of said programmatically generated remote methods in said first remote proxy using said network linkage;

computer-readable program code means for installing said first set of objects and said first local proxy for each object of said first subset on said first computer;

computer-readable program code means for installing said second set of objects and said first remote proxy for each object of said first subset on said second computer; and computer-readable program code means for transparently accessing selected ones of said first plurality of programmed methods in selected ones of said objects in said second set, in response to invocation by selected ones of said objects in said first set, through a selected one of said first local proxies and a corresponding one of said first remote proxies.

7. The computer program product as claimed in claim 6, wherein said programmatically generated local methods in said first local proxy for each object have identical names as corresponding methods in said first plurality of programmed methods.

8. The computer program product as claimed in claim 6, wherein said network linkage includes statements for remote invocation of each of said corresponding ones of said programmatically generated remote methods in said first remote proxy.

9. The computer program product as claimed in claim 6, further comprising:

computer-readable program code means for determining a second plurality of programmed methods which are accessed from said objects in said second set but which are contained in said objects of said first set;

computer-readable program code means for determining a second subset of said objects in said first set which contain said second plurality of programmed methods;

computer-readable program code means for programmatically generating a second local proxy and a corresponding second remote proxy for each object in said second subset, said second remote proxy containing at least one programmatically generated remote method, wherein each of said programmatically generated remote methods accesses a corresponding method from said second plurality of programmed methods and said second local proxy containing network linkage and at least one programmatically generated local method, wherein each of said programmatically generated local methods accesses a corresponding one of said programmatically generated remote methods in said second remote proxy using said network linkage;

computer-readable program code means for installing said second local proxy for each object of said second subset on said second computer;

computer-readable program code means for installing second remote proxy for each object in said second subset on said first computer; and computer-readable program code means for transparently accessing selected ones of said second plurality of programmed methods in selected ones of said objects in said first set, in response to invocation by selected ones of said objects in said second set, through a selected one of said second local proxies and a corresponding one of said second remote proxies.

10. The computer program product as claimed in claim 9, wherein said programmatically generated local methods in said second local proxy for each object have identical names as corresponding methods in said second plurality of programmed methods.

11. A system for programmatically creating distributed object programs, said system comprising:

means for identifying a plurality of objects in a program to be distributed, wherein each of said objects contains one or more programmed methods;

means for determining a first set of objects which are to reside on a first computer and a second set of objects which are to reside on a second computer, wherein said first set and said second set together comprise said identified plurality;

means for determining a first plurality of programmed methods which are accessed from said objects in said first set but which are contained in said objects of said second set;

means for determining a first subset of said objects in said second set which contain said first plurality of programmed methods;

means for programmatically generating a first local proxy and a corresponding first remote proxy for each object in said first subset, said first remote proxy containing at least one programmatically generated remote method, wherein each of said programmatically generated remote methods accesses a corresponding method from said first plurality of programmed methods and said first local proxy containing network linkage and at least one programmatically generated local method, wherein each of said programmatically generated local methods accesses a corresponding one of said programmatically generated remote methods in said first remote proxy using said network linkage;

means for installing said first set of objects and said first local proxy for each object of said first subset on said first computer;

means for installing said second set of objects and said first remote proxy for each object of said first subset on said second computer; and means for transparently accessing selected ones of said first plurality of programmed methods in selected ones of said objects in said second set, in response to invocation by selected ones of said objects in said first set, through a selected one of said first local proxies and a corresponding one of said first remote proxies.

12. The system as claimed in claim 11, wherein said programmatically generated local methods in said first local proxy for each object have identical names as corresponding methods in said first plurality of programmed methods.

13. The system as claimed in claim 11, wherein said network linkage includes statements for remote invocation of each of said corresponding ones of said programmatically generated remote methods in said first remote proxy.

14. The system as claimed in claim 11, further comprising:

means for determining a second plurality of programmed methods which are accessed from said objects in said second set but which are contained in said objects of said first set;

means for determining a second subset of said objects in said first set which contain said second plurality of programmed methods;

means for programmatically generating a second local proxy and a corresponding second remote proxy for each object in said second subset, said second remote proxy containing at least one programmatically generated remote method, wherein each of said programmatically generated remote methods accesses a corresponding method from said second plurality of programmed methods and said second local proxy containing network linkage and at least one programmatically generated local method, wherein each of said programmatically generated local methods accesses a corresponding one of said programmatically generated remote methods in said second remote proxy using said network linkage;

means for installing said second local proxy for each object of said second subset on said second computer;

means for installing second remote proxy for each object in said second subset on said first computer; and means for transparently accessing selected ones of said second plurality of programmed methods in selected ones of said objects in said first set, in response to invocation by selected ones of said objects in said second set, through a selected one of said second local proxies and a corresponding one of said second remote proxies.

15. The system as claimed in claim 14, wherein said programmatically generated local methods in said second local proxy for each object have identical names as corresponding methods in said second plurality of programmed methods.

* * * * *